United States Patent
Nagao et al.

(10) Patent No.: US 8,049,452 B2
(45) Date of Patent: Nov. 1, 2011

(54) CONTROL METHOD, CONTROL CIRCUIT, AND CONTROL PROGRAM FOR POWER RETRACTABLE OUTER MIRROR FOR A VEHICLE

(75) Inventors: Mitsuyoshi Nagao, Shizuoka (JP); Noriyuki Takemasa, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 592 days.

(21) Appl. No.: 12/079,279

(22) Filed: Mar. 26, 2008

(65) Prior Publication Data
US 2009/0001910 A1   Jan. 1, 2009

(30) Foreign Application Priority Data
Jun. 29, 2007   (JP) .................. 2007-172134

(51) Int. Cl.
*G05B 5/00*   (2006.01)
(52) U.S. Cl. .................. 318/466; 318/468; 318/469
(58) Field of Classification Search .................. 318/466, 318/468, 469, 479, 139, 484, 471; 348/345; 320/163; 307/10.1
See application file for complete search history.

(56) References Cited

U.S. PATENT DOCUMENTS

| | | | | |
|---|---|---|---|---|
| 5,799,217 A | * | 8/1998 | Saegusa et al. | 396/279 |
| 6,857,754 B2 | * | 2/2005 | Fukai | 359/872 |

FOREIGN PATENT DOCUMENTS

| | | |
|---|---|---|
| EP | 0 659 610 A1 | 6/1995 |
| JP | 8-40146 A | 2/1996 |
| JP | 10-285005 A | 10/1998 |
| JP | 2002-347522 A | 12/2002 |
| JP | 2005-112068 A | 4/2005 |
| WO | WO99/62742 | 12/1999 |

OTHER PUBLICATIONS
PCT Search Report dated Nov. 4, 2010.

* cited by examiner

*Primary Examiner* — Karen Masih
(74) *Attorney, Agent, or Firm* — Hedman & Costigan, P.C.; James V. Costigan

(57) ABSTRACT

A control method can stop motor operation reliably when a mirror rotator is mechanically locked at a driven end of the mirror rotator. The control method operates a motor 18 according to battery voltage. The motor 18 is operated with an operating time set and is stopped after a lapse of the set operating time, where the operating time is a time required for the motor 18 to drive the mirror rotator 14 from the retracted position or the working position to the working position or the retracted position at which the mirror rotator 14 is locked by a stopper. The control method detects the battery voltage, and decreases the set operating time of the motor 18 when the detected battery voltage is high or increases the set operating time of the motor 18 when the detected battery voltage is low.

8 Claims, 1 Drawing Sheet

MOTOR OPERATING TIME

H: SHORTEST TIME TO MOTOR BURNOUT AT HIGHEST OPERATING TEMPERATURE

M: EXAMPLE OF SETTING OF RELATIONSHIP

L: LONGEST TIME REQUIRED FOR ROTATION AT LOWEST OPERATING TEMPERATURE

BATTERY VOLTAGE (V)

CONTROL METHOD, CONTROL CIRCUIT, AND CONTROL PROGRAM FOR POWER RETRACTABLE OUTER MIRROR FOR A VEHICLE

The disclosure of Japanese Patent Application No. JP2007-172134 filed on Jun. 29, 2007 including the specification, drawing and abstract is incorporated herein by reference in its entirety.

BACKGROUND OF THE INVENTION

1. Field of the Invention

The present invention relates to a control method, control circuit, and control program for a power retractable mirror which allow motor operation to be stopped (allow a motor to be turned off) reliably when a mirror rotator is mechanically locked at a driven end of the mirror rotator.

2. Description of the Related Art

Power retractable mirrors are used as vehicle outer mirrors (mainly side mirrors), in which a mirror rotator (including a mirror housing and part which rotates together with the mirror housing) is moved by a motor from working (standing) position to retracted position and from retracted position to working position. Normally, a rotational movement of the power retractable mirror is started when the motor is started with the throw of a switch in the vehicle. Once the motor is started, the mirror rotator rotates automatically from standing position to retracted position (or from retracted position to standing position). When the rotational movement is mechanically locked at a driven end (retracted position or standing position) by a stopper, the motor drive stops automatically.

Techniques for automatically stopping the motor drive at the driven end of the rotational movement of the mirror rotator include those described in Japanese Patent Laid-Open No. 8-40146 and Japanese Patent Laid-Open No. 2002-347522. The technique described in Japanese Patent Laid-Open No. 8-40146 involves inserting a resistor in a drive circuit of the motor and stopping the motor by detecting a voltage across the resistor. Specifically, when the rotational movement of the mirror rotator is mechanically locked at its driven end, a current flowing through the motor increases (a locked-rotor current flows), causing an increase in the voltage across the resistor, and the motor is stopped when the increase in the voltage is detected. The technique described in Japanese Patent Laid-Open No. 2002-347522 involves inserting a PTC element (positive temperature coefficient thermistor) in a drive circuit of the motor and detecting a voltage at one end of the PTC element. Specifically, when the rotational movement of the mirror rotator is mechanically locked at its driven end, a current flowing through the motor increases, causing the PTC element to generate heat, which in turn causes an increase in resistance of the PTC element thereby causing an increase in the voltage at the end of the PTC element, and the motor is stopped when the increase in the voltage is detected.

With the technique described in Japanese Patent Laid-Open No. 8-40146, if there is a small difference between locked-rotor current and steady-state current, it is difficult to detect mechanical locking of the stopper. If the mechanical locking fails to be detected, the motor continues to draw power, which can result in burnout.

The technique described in Japanese Patent Laid-Open No. 2002-347522 has the advantage that it is easier to detect mechanical locking than with the technique described in Japanese Patent Laid-Open No. 8-40146 even if there is a small difference between locked-rotor current and steady-state current. However, even with the technique described in Japanese Patent Laid-Open No. 2002-347522, if the control circuit including the PTC element is placed outside the mirror (especially in the vehicle), it is difficult to detect mechanical locking of the stopper due to temperature differences between placement location of the mirror (outside the vehicle) and placement location of the control circuit (inside the vehicle). That is, PTC elements have short detection time at high temperatures and long detection time at low temperatures, where the detection time is the interval between the time when mechanical locking occurs and the time when detection temperature is reached. Therefore, if mechanical locking occurs in summertime when it is hot outside the vehicle (the motor inside the mirror is hot) and it is cool inside the vehicle (the PTC element is cold) due to air conditioning, the PTC element is slow to detect the mechanical locking even though the motor is liable to generate heat, which can result in motor burnout.

SUMMARY OF THE INVENTION

The present invention has been made in view of the above points and has an object to provide a control method, control circuit, and control program which can stop motor operation reliably when a mirror rotator is mechanically locked at a driven end of the mirror rotator.

The present invention provides a control method for a power retractable mirror in which a mirror rotator being driven by a motor moves from a retracted position to a working position and from the working position to the retracted position, the control method comprising the steps of: operating the motor according to battery voltage; operating the motor with an operating time (conducting time) set and stopping the motor after a lapse of the set operating time, where the operating time is a time required for the motor to drive the mirror rotator from the retracted position or the working position to the working position or the retracted position at which the mirror rotator is locked by a stopper; and detecting the battery voltage, and decreasing the set operating time of the motor in a relative sense when the detected battery voltage is relatively high or increasing the set operating time of the motor in a relative sense when the detected battery voltage is relatively low.

Since the control method according to the present invention sets the operating time of the motor and stops the motor after the lapse of the set operating time, the motor can be stopped reliably when the mirror rotator is mechanically locked at the driven end. The time required for the mirror rotator to move from the retracted position to the working position or from the working position to the retracted position varies with the battery voltage. Specifically, when the battery voltage is high, rotational speed of the motor is high, decreasing the operating time. On the other hand, when the battery voltage is low, the rotational speed of the motor is low, increasing the operating time. Thus, by detecting the battery voltage, the control method according to the present invention sets the operating time of the motor relatively short when the detected battery voltage is relatively high or sets the operating time of the motor relatively long when the detected battery voltage is relatively low. This makes it less likely that the motor will stop before the mirror rotator is locked by the stopper (i.e., before the working position or retracted position is reached) when the battery voltage is low and that the motor will continue to draw power until burnout after the mirror rotator is locked by the stopper when the battery voltage is high.

In the control method according to the present invention, the operating time of the motor at different levels of the battery voltage may be set between the longest time required for the motor at the lowest operating temperature to drive the mirror rotator starting at the retracted position or the working position until the mirror rotator is locked at the working position or the retracted position by the stopper and the shortest time required for the motor at the highest operating temperature to drive the mirror rotator starting at the retracted position or the working position until the motor is burnt out after the mirror rotator is locked at the working position or the retracted position by the stopper. This reliably prevents the motor from stopping before the mirror rotator is locked by the stopper when the battery voltage is low and reliably prevents the motor from continuing to draw power until burnout after the mirror rotator is locked by the stopper when the battery voltage is high.

A control circuit according to the present invention performs the control method. The present invention is especially effective when the control circuit is installed outside the power retractable mirror.

A control program according to the present invention makes a processor perform the control method.

DETAILED DESCRIPTION OF THE PREFERRED EMBODIMENTS

Figure 1:
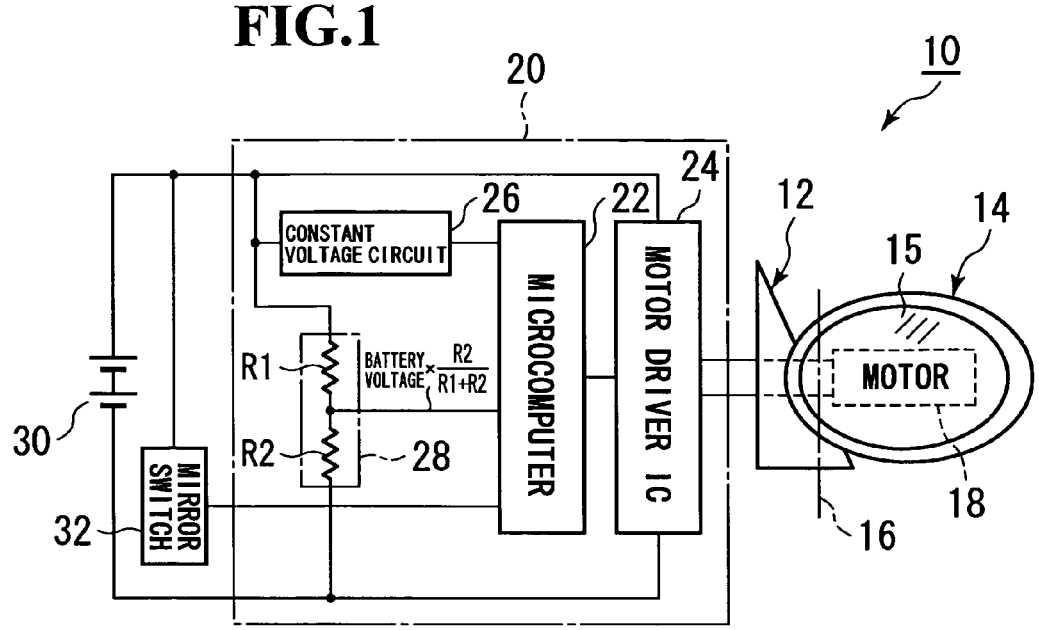
FIG. 1 is a circuit diagram showing an embodiment of a control circuit for a power retractable mirror according to the present invention.

An embodiment of a control circuit for a power retractable mirror according to the present invention is shown in FIG. 1. Mechanical components of the power retractable mirror 10 installed outside a vehicle include a mirror base 12 and a mirror rotator 14. The mirror base 12 is fixed to an outer surface of a vehicle door. The mirror rotator 14 is supported on the mirror base 12 rotatably around a rotation axis 16. A mirror body (mirror plate) 15 is mounted on the mirror rotator 14. The mirror rotator 14 contains a motor 18 and gears (not shown). When the motor 18 rotates in forward and reverse directions, the mirror rotator 14 moves from the retracted position (lying down along a car body) to the working position (protruding laterally outward from the vehicle) or from the working position to the retracted position by rotating around the rotation axis 16. The mirror rotator 14 is locked at the retracted position and working position by respective stoppers (not shown).

A control circuit 20 controls operation of the motor 18. The control circuit 20 is installed in the vehicle (in a dashboard, door, or the like). The control circuit 20 includes a microcomputer 22, motor driver IC 24, constant voltage circuit 26 for the microcomputer, and resistive voltage divider circuit 28 for detection of battery voltage. The control circuit 20 draws power (for operation of motor and microcomputer) from a 12-V battery 30 of the vehicle. The motor 18 operates on the battery voltage. More precisely, the motor 18 operates on the voltage supplied from the battery 30 via a switching element of the motor driver IC 24 (the supplied voltage is almost equal to the voltage of the battery 30 because the switching element causes only small voltage drops). The microcomputer 22 operates on the voltage supplied from the battery 30 which is kept constant by the constant voltage circuit 26.

A mirror switch 32 is installed near a driver's seat in the vehicle and operated by the driver. When the mirror rotator 14 is at the retracted position, a press of the mirror switch 32 (a push switch or the like) gives a command to move the mirror rotator 14 to the working position. When the mirror rotator 14 is at the working position, a press of the mirror switch 32 gives a command to move the mirror rotator 14 to the retracted position. The microcomputer 22 detects the press of the mirror switch 32 and turns on or off the motor driver IC 24 to operate the motor 18 in an appropriate direction. That is, if the mirror switch 32 is pressed when the mirror rotator 14 is at the retracted position, the microcomputer 22 operates the motor 18 by controlling the motor driver IC 24 and thereby rotates the mirror rotator 14 to the working position. On the other hand, if the mirror switch 32 is pressed when the mirror rotator 14 is at the working position, the microcomputer 22 operates the motor 18 in the reverse direction by controlling the motor driver IC 24 and thereby rotates the mirror rotator 14 to the retracted position. Operating time of the motor 18 is controlled to the time set on the microcomputer 22, and the motor 18 stops after a lapse of the set operating time.

The time required for the mirror rotator 14 to move from the retracted position to the working position or from the working position to the retracted position varies with the battery voltage, being short when the battery voltage is high and becoming longer with decreases in the battery voltage. The microcomputer 22 controls the operating time of the motor 18 according to the battery voltage detected by the resistive voltage divider circuit 28. That is, the resistive voltage divider circuit 28 includes a series-connected circuit of resistances R1 and R2 connected between electrodes of the battery 30 and inputs a voltage (battery voltage×R2/(R1+R2)) at a connection point of the resistances R1 and R2 into the microcomputer 22. The microcomputer 22 controls the operating time of the motor 18 as follows according to this voltage. That is, the microcomputer 22 decreases the operating time of the motor 18 when the voltage is high and increases the operating time of the motor 18 when the voltage is low. This makes it less likely that the motor 18 will stop before the mirror rotator 14 is locked by the stopper (i.e., before the working position or retracted position is reached) when the voltage is low and that the motor 18 will continue to draw power until burnout after the mirror rotator 14 is locked by the stopper when the voltage is high.

The time required for the mirror rotator 14 to move from the retracted position to the working position or from the working position to the retracted position also varies with operating temperature (outside air temperature). That is, when the operating temperature is low, grease in a gear box of the mirror rotator 14 hardens, increasing the time required for the movement of the mirror rotator 14, but when the operating temperature is high, the grease softens, decreasing the time required for the movement of the mirror rotator 14. Thus, by taking into consideration changes in rotational speed of the mirror rotator 14 with differences in the operating temperature, the operating time of the motor 18 is set in a hatched area in FIG. 2. Specifically, a lower limit line L represents the longest time required for the motor 18 at the lowest operating temperature (e.g., −30° C.) to drive the mirror rotator 14 starting at the retracted position or the working position until the mirror rotator 14 is locked at the working position or the retracted position by the stopper when the battery voltage is in a normal range of variation (8 to 16 V in this example). Thus, by setting the operating time of the motor 18 at a value above the lower limit line L at or above the lowest operating temperature, the mirror rotator 14 can be moved reliably until it is locked at the working position. On the other hand, an upper limit line H represents the shortest time required for the motor 18 at the highest operating temperature (e.g., +80° C.) to drive the mirror rotator 14 starting at the retracted position or the working position until the motor 18 is burnt out after the mirror rotator 14 is locked at the working position or the retracted position by the stopper when the battery voltage is in the normal range of variation. Thus, by setting the operating time of the motor 18 at a value below the upper limit line H, it is possible to prevent the motor 18 reliably from burning out at or below the highest operating temperature. In this way, by setting the operating time of the motor 18 at a value in the hatched area in FIG. 2 according to the battery voltage, it is possible to reliably prevent the motor from stopping before the mirror rotator is locked by the stopper when the battery voltage is low and reliably prevent the motor from continuing to draw power until burnout after the mirror rotator is locked by the stopper when the battery voltage is high, provided the battery voltage is in the normal range of variation.

Figure 2:
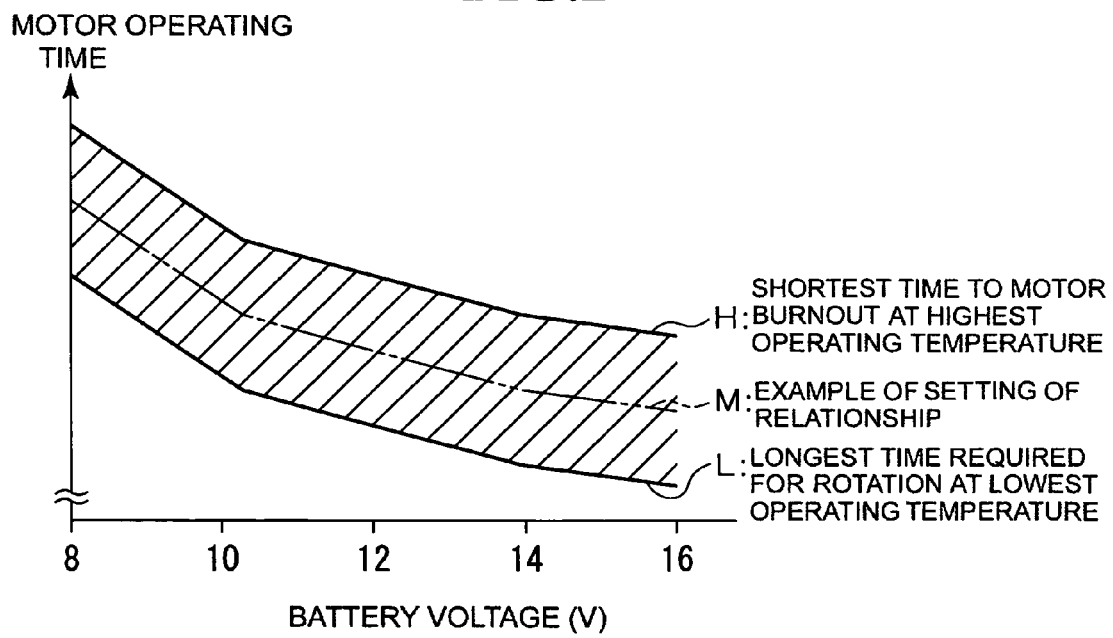
FIG. 2 is a diagram showing a relationship between battery voltage and motor operating time defined in a microcomputer, a hatched area representing a setting range of the relationship and a dash-and-dot line representing an example of a setting of the relationship.

A relationship between the detected voltage and operating time (e.g., a dash-and-dot line M drawn along the centerline between the lower limit line L and upper limit line H) has been defined in the microcomputer 22 to decrease the operating time of the motor 18 when the detected voltage is high and increase the operating time of the motor 18 when the detected voltage is low in the hatched area in FIG. 2. The microcomputer 22 controls the operating time of the motor 18 according to the detected voltage based on the defined relationship. This prevents the motor from stopping before the mirror rotator is locked by the stopper when the battery voltage is low and prevents the motor from continuing to draw power until burnout after the mirror rotator is locked by the stopper when the battery voltage is high, over the entire range of operating temperatures (e.g., −30 to +80° C.).

What is claimed is:

1. A control method for a power retractable outer mirror for a vehicle in which a mirror rotator being driven by a motor moves from a retracted position to a working position and from the working position to the retracted position, comprising the steps of:
   operating the motor according to battery voltage;
   operating the motor with an operating time set and stopping the motor after a lapse of the set operating time, where the operating time is a time required for the motor to drive the mirror rotator from the retracted position or the working position to the working position or the retracted position at which the mirror rotator is locked by a stopper; and
   detecting the battery voltage, and decreasing the set operating time of the motor when the detected battery voltage is high and increasing the set operating time of the motor when the detected battery voltage is low.

2. The control method for a power retractable outer mirror for a vehicle according to claim 1, wherein the operating time of the motor at different levels of the battery voltage is set between the longest time required for the motor at the lowest operating temperature to drive the mirror rotator starting at the retracted position or the working position until the mirror rotator is locked at the working position or the retracted position by the stopper and the shortest time required for the motor at the highest operating temperature to drive the mirror rotator starting at the retracted position or the working position until the motor is burnt out after the mirror rotator is locked at the working position or the retracted position by the stopper.

3. A control circuit for a power retractable outer mirror for a vehicle, wherein the control circuit performs the control method for a power retractable outer mirror for a vehicle according to claim 1.

4. The control circuit for a power retractable outer mirror for a vehicle according to claim 3, wherein the control circuit is installed outside the power retractable mirror.

5. A control circuit for a power retractable outer mirror for a vehicle, wherein the control circuit performs the control method for a power retractable outer mirror for a vehicle according to claim 2.

6. The control circuit for a power retractable outer mirror for a vehicle according to claim 5, wherein the control circuit is installed outside the power retractable mirror.

7. A control program for a power retractable outer, mirror for a vehicle, wherein the control program makes a processor perform the control method for a power retractable outer mirror for a vehicle according to claim 1.

8. A control program for a power retractable outer mirror for a vehicle, wherein the control program makes a processor perform the control method for a power retractable outer mirror for a vehicle according to claim 2.

* * * * *